(12) United States Patent
Mak

(10) Patent No.: US 8,065,890 B2
(45) Date of Patent: Nov. 29, 2011

(54) CONFIGURATIONS AND METHODS FOR LPG PRODUCTION AND POWER COGENERATION

(75) Inventor: John Mak, Santa Ana, CA (US)

(73) Assignee: Fluor Technologies Corporation, Aliso Viejo, CA (US)

( * ) Notice: Subject to any disclaimer, the term of this patent is extended or adjusted under 35 U.S.C. 154(b) by 1058 days.

(21) Appl. No.: 11/574,271

(22) PCT Filed: Aug. 30, 2005

(86) PCT No.: PCT/US2005/031005
§ 371 (c)(1),
(2), (4) Date: Nov. 5, 2007

(87) PCT Pub. No.: WO2006/036441
PCT Pub. Date: Apr. 6, 2006

(65) Prior Publication Data
US 2008/0190135 A1    Aug. 14, 2008

Related U.S. Application Data

(60) Provisional application No. 60/612,473, filed on Sep. 22, 2004.

(51) Int. Cl.
*F25J 1/00* (2006.01)
*F25J 3/00* (2006.01)

(52) U.S. Cl. .......................................... 62/614; 62/620

(58) Field of Classification Search .............. 62/611, 62/612, 613, 614, 618, 619, 620; 60/618, 60/643, 651, 655, 671
See application file for complete search history.

(56) References Cited

U.S. PATENT DOCUMENTS

| 3,394,555 | A  |   | 7/1968  | La Fleur |
|-----------|----|---|---------|----------|
| 3,837,172 | A  | * | 9/1974  | Markbreiter et al. ............ 62/621 |
| 4,231,226 | A  | * | 11/1980 | Griepentrog ..................... 60/648 |
| 4,304,634 | A  |   | 12/1981 | Garwin |
| 4,400,947 | A  | * | 8/1983  | Ruhemann ....................... 60/648 |
| 4,429,536 | A  | * | 2/1984  | Nozawa ........................... 60/655 |
| 4,444,015 | A  | * | 4/1984  | Matsumoto et al. ............ 60/648 |
| 4,551,979 | A  |   | 11/1985 | Wilensky |
| 5,114,451 | A  | * | 5/1992  | Rambo et al. .................... 62/623 |
| 5,295,350 | A  |   | 3/1994  | Child et al. |
| 5,394,686 | A  |   | 3/1995  | Child et al. |
| 5,890,377 | A  | * | 4/1999  | Foglietta .......................... 62/621 |
| 5,944,984 | A  |   | 8/1999  | Benguigui et al. |
| 6,089,028 | A  | * | 7/2000  | Bowen et al. ................... 62/50.2 |
| 6,233,938 | B1 | * | 5/2001  | Nicodemus ...................... 60/651 |
| 6,564,579 | B1 | * | 5/2003  | McCartney ...................... 62/620 |
| 2004/0065113 | A1 |   | 4/2004 | Paradowski |
| 2004/0079107 | A1 | * | 4/2004 | Wilkinson et al. .............. 62/611 |

(Continued)

*Primary Examiner* — Frantz F. Jules
*Assistant Examiner* — Lukas Baldridge
(74) *Attorney, Agent, or Firm* — Fish & Associates, PC

(57) ABSTRACT

An LNG plant is configured to receive rich LNG and to produce LPG, lean LNG, and power using at least one fractionation column, wherein the fractionation portion of the plant can be optionally thermally coupled to a power cycle utilizing residual refrigeration from the processed lean LNG. Most preferably, a liquid portion of the rich LNG is pumped to pressure and heated, and the pressurized and superheated portion is expanded to produce electric energy before being fed into the column. The column overhead vapor is partially condensed, providing column reflux for high NGL recoveries, and the residual vapor is further condensed using refrigeration content of the rich LNG forming the lean LNG product, that is further pumped to pipeline pressure and subsequently vaporized using heated working fluid of the power cycle.

16 Claims, 2 Drawing Sheets

U.S. PATENT DOCUMENTS

| | | |
|---|---|---|
| 2004/0083756 A1 | 5/2004 | Tranier |
| 2004/0107700 A1* | 6/2004 | McClanahan et al. .......... 60/670 |
| 2005/0155381 A1* | 7/2005 | Yang et al. ...................... 62/620 |
| 2010/0107634 A1* | 5/2010 | Xu et al. ......................... 60/651 |

* cited by examiner

US 8,065,890 B2

CONFIGURATIONS AND METHODS FOR LPG PRODUCTION AND POWER COGENERATION

This application claims priority to our copending U.S. provisional patent application with the Ser. No. 60/612,473, filed Sep. 22, 2004, and which is incorporated by reference herein.

FIELD OF THE INVENTION

The field of the invention is gas processing, especially as it relates to LPG (liquefied petroleum gas) production and power cogeneration while regasifying LNG (liquefied natural gas).

BACKGROUND OF THE INVENTION

Recent advances in LNG liquefaction processes have made LNG an attractive energy source, and various commercial users have begun to explore LNG uses in applications other than natural gas production. However, currently known LNG regasification processes often require considerable fuel gas consumption for heating. Alternatively, and where available, the heat content of seawater using open rack seawater heaters may be used to regasify the LNG. Unfortunately, LNG seawater heaters have a negative environmental impact on the ocean life from the cold seawater discharge, and seawater systems tend to be costly. Additional problems are present where the heating value of the LNG varies among shipments, or where a particular LNG composition is not suitable for a specific market. Therefore, LNG must often be processed to conform to the heating value, Wobbe Index, and composition required by local environmental regulations and combustion equipment specifications, thereby further adding to the cost of production.

Recently, various configurations have been proposed that accommodate LNG with varying composition as described in our copending International patent application with the serial number PCT/US03/25372, which is incorporated by reference herein. Furthermore, a portion of the power consumed in liquefaction is recoverable at the receiving terminal when LNG is used as a heat sink for power generation, and/or as fuel for a power plant. Such and other configurations are described in our copending International patent applications with the serial numbers PCT/US03/26805, and PCT/US05/24973, all of which are incorporated by reference herein.

While all or almost all of such improved configurations and methods provide at least some advantages over previously known configurations, various disadvantages nevertheless remain. Among other things, most of the known plants will either produce an ethane and/or C3+ fraction, or take advantage of the refrigeration content of LNG. However, currently known configurations to condition import LNG typically require stripping and recompression, which are inefficient and costly. In addition, these processes are inadequate for processing rich LNG while producing ethane and LPG products for sales and co-generating power. Therefore, there is still a need to provide improved plant configurations and methods in which the rich LNG is processed while producing ethane, LPG and power.

SUMMARY OF THE INVENTION

The present invention is directed to configurations and methods for LNG processing plants that produce lean LNG, ethane, LPG, and power.

In one aspect of the inventive subject matter, the LNG fractionation plant can be optionally coupled to a power cycle and includes a heat exchanger and separator that are coupled to a fractionation column and configured to partially condense the column overhead vapor, separating a lean (methane rich) liquid that is refluxed to the column and a lean vapor (mostly methane) that is condensed forming a lean LNG condensate product having a temperature sufficient to provide refrigeration to a working fluid in the power cycle. Additionally, a power generator is driven by an expander that is configured to expand a pressurized and heated liquid portion of the rich LNG to thereby produce power and a feed stream to the column. Most preferably, a pump is configured to pump the lean LNG condensate to pipeline pressure, and the working fluid in the power cycle comprises a multi-component fluid (e.g., mixture of nitrogen, methane, ethane, propane, butane, and pentane). A further pump may be included that pumps the flashed liquid portion of the rich LNG to thereby form a pressurized liquid portion of the rich LNG, and a heat source that heats the pressurized liquid portion of the rich LNG to thereby form a supercritical pressure and superheated portion of the rich LNG. In preferred plants, the heat source is advantageously configured to provide at least a portion of the stripping and heating requirements for the column via the expander discharge of the heated portion of the rich LNG.

In another aspect of the inventive subject matter, a plant includes a power generator driven by an expander that receives a heated pressurized (supercritical) portion of the rich LNG and that forms an expanded feed to thereby generate electric power. A fractionator is configured to receive the expanded feed and a vapor portion of the rich LNG to thereby produce a bottom product containing ethane and/or LPG and a column overhead vapor, that is coupled to a first heat exchanger configured to at least partially condense at least a portion of the column overhead vapor, and generate a liquid reflux to the column, and condense the lean vapor forming the lean LNG condensate. Typically, such plants will further include a pump upstream of a second heat exchanger, wherein the pump is configured to receive and pressurize the lean LNG condensate to pipeline pressure.

Most preferably, the first heat exchanger in such contemplated plants is configured to use rich LNG as refrigerant to condense at least a portion of the column overhead, and/or the second heat exchanger is configured to use a heated mixed working fluid from a power cycle to regasify the pressurized lean LNG condensate. A third heat exchanger may be included that heats a pressurized liquid portion of rich LNG to thereby form the heated pressurized (supercritical) fluid of rich LNG. It is particularly preferred in such plants that the third heat exchanger is configured to provide at least a portion or substantially all of the heating requirements for the fractionation via the expander discharge from the heated pressurized liquid portion of rich LNG.

Consequently, in yet another aspect of the inventive subject matter, a method of operating a plant includes a step in which a rich LNG is heated, separated and the separator liquid portion is pressurized and heated, and in which the pressurized and heated portion is expanded to thereby generate power and then fed as a stripping vapor to the column while the separator vapor portion of the rich LNG is further fed to the column to thereby produce ethane, and/or LPG and a column overhead product. The column overhead vapor is then at least partially condensed using refrigeration content of the rich LNG and the condensate is refluxed back to the column while the vapor portion is condensed as the lean LNG condensate which is pumped to pipeline pressure. In yet another step, the lean LNG condensate is vaporized in a heat exchanger using a working fluid of a power cycle.

Preferably, contemplated methods further include a step of separating a rich LNG into a vapor portion and a liquid portion to thereby form the liquid portion of the rich LNG, and the step of at least partially condensing the column vapor comprises the steps of (1) cooling the column overhead vapor, (2) separating a vapor portion of the cooled product from a liquid portion, and (3) separating a liquid portion of the cooled product to be pumped as reflux to the column to improve ethane and/or LPG recovery and (4) further cooling the separated vapor portion to thereby form the lean LNG condensate (typically, steps (1), (2) and (4) employ refrigeration content of the rich LNG). It is further preferred that an additional step of heating the pressurized liquid portion of the rich LNG will provide at least a portion of the stripping and heating requirements for the column.

Various objects, features, aspects and advantages of the present invention will become more apparent from the following detailed description of preferred embodiments of the invention.

DETAILED DESCRIPTION

The inventor discovered that a plant can be configured to process non-compliant, rich LNG while producing ethane and/or LPG, compliant lean LNG and power. In preferred configurations, power is generated in at least two locations, wherein the first location is a power cycle (e.g., Rankine cycle) that uses refrigeration cold of lean LNG condensate, and wherein the second location is within the fractionation portion of the plant (typically by expansion of the heated and pressurized (supercritical) portion of the rich LNG).

Figure 1:
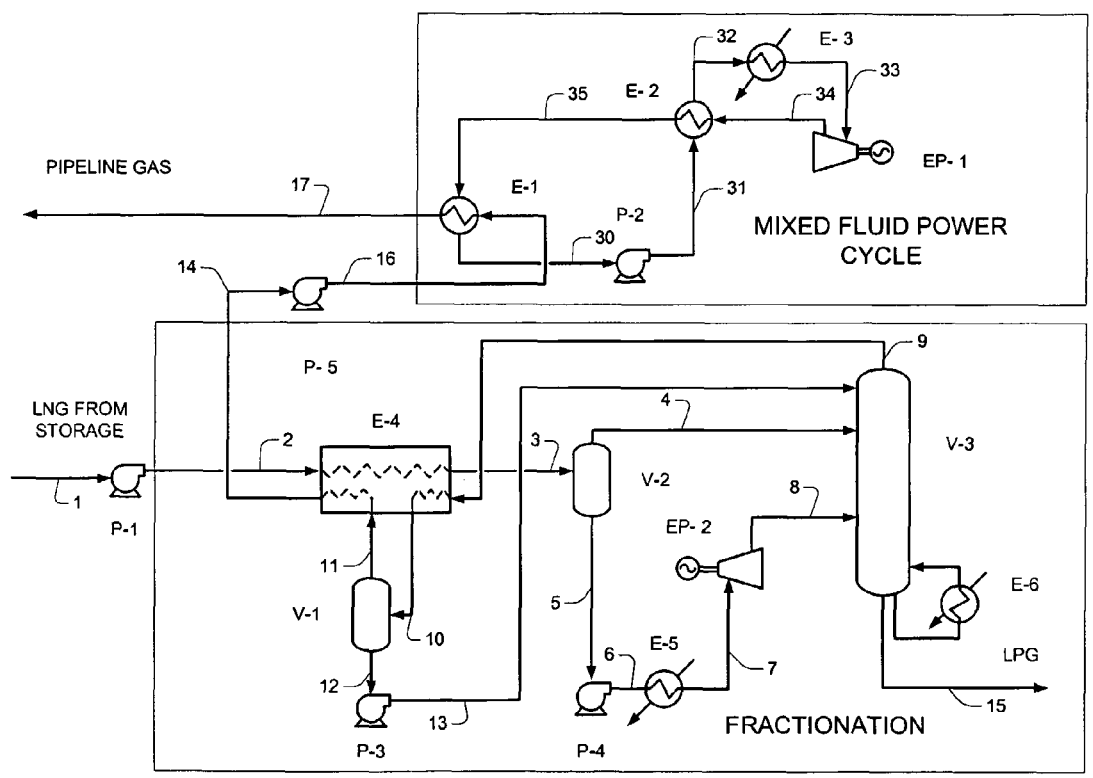
FIG. 1 is a schematic view of one exemplary plant according to the inventive subject matter for a plant that recovers ethane and/or LPG and power with LNG import.

In one exemplary configuration of contemplated plants as depicted in FIG. 1, LNG with a composition as shown in Table 1 is supplied to the plant as stream 1 at a rate of about 1,200 MMscfd. Stream 1 is pressurized by LNG pump P-1 to about 500 psig forming stream 2, and fed to the LNG fractionation plant. The refrigeration content of the rich LNG is utilized in exchanger E-4, which serves dual functions. First, exchanger E-4 uses the refrigeration content in the rich LNG stream 2 to condense the column overhead stream 9 to thereby produce a cold reflux stream 13 to the column V-3. The cold reflux stream 13 is formed from the condensing the column overhead stream 10, that is separated in reflux separator V-1 into stream 11 and stream 12. Second, exchanger E-4 condenses the vapor stream 11 to thereby form stream 14 (comprising at least separator condensed lean vapor), which allows the liquid to be pumped by pump P-5 to thereby form pressurized lean LNG condensate stream 16, typically at pipeline pressure of about 1400 psig. It should be especially appreciated that such configurations are significantly more energy efficient in increasing the natural gas product pressure to the pipeline pressure via pumping, which typically requires a pipeline compressor with significantly higher energy demands.

After heat exchange in E-4, the heated rich LNG stream 3 has a temperature of about −90° F. and is partially vaporized. The two-phase stream 3 is separated in vessel V-2, and the flashed vapor stream 4 is fed to the upper rectification trays of column V-3, while the flashed liquid stream 5 is used for power generation and stripping. The flashed liquid stream 5, at a rate of about 2,200 gpm, is pumped by pump P-4 to about 1500 to 2000 psig forming stream 6, heated in exchanger E-5 to about 600° F. forming stream 7. The so generated high pressure and high temperature vapor is expanded in expander EP-2 to about 460 psig, generating about 8 to 12 MW power. The expander discharge vapor stream 8, typically at 300° F., is used as stripping vapor in the column. It should be particularly noted that the stripping vapor supplies most of the heating and stripping requirement (typically at least 70%, more typically at least 85%, and most typically at least 90%) of the fractionator. However, where desirable, the fractionator can be trim-heated with bottom reboiler E-6. The bottom product 15 contains ethane and/or LPG which can be further processed or sold as commodity.

The fractionator operates preferably at about 450 psig with an overhead temperature of about −65° F. The overhead vapor stream 9 is cooled to about −105° F. in exchanger E-4 and partially condensed forming stream 10. The condensed liquid stream 12 is separated in reflux separator V-1 and returned to the column as reflux stream 13 using the reflux pump P-3. The separator vapor from V-1 (stream 11), is further cooled and condensed in the cold section of E-4 to form stream 14, forming a lean LNG condensate at about −140° F. The lean LNG condensate is then pumped by pump P-5 to about 1400 psig forming stream 16, or pressure as required for pipeline transmission. In addition, the lean LNG stream 16 at about −140° F. still contains a significant amount of refrigeration content that can be utilized. The lean LNG can be further heated in conventional regasification equipment such as fuel gas LNG vaporizers or open rack seawater vaporizers, or optionally, a multi-component power generation cycle can be coupled to the above described configuration to further generate power using the residual cold energy from the lean LNG condensate as described below. Note that the LNG fractionation and power generation cycle can be decoupled from the LNG sendout, utilizing conventional LNG vaporizers, that ensures independent operation of the LNG regasification facilities from the LNG fractionation and power generation plants.

It is generally preferred that the power cycle is a closed cycle (e.g., Rankine cycle) and that the working fluid can be a pure component or preferably a multi-component working fluid. Furthermore, the power cycle is preferably thermally coupled to the LNG fractionation plant downstream of pump P-5. As shown in FIG. 1, the working fluid, stream 30, is pumped by Pump P-2 to a supercritical pressure, typically 1500 psig forming stream 31. The high pressure fluid is first heated with the hot expander discharge stream 34 in Recuperator Exchanger E-2. The so heated high pressure fluid stream 32 is further heated in heater E-3 to about 600° F. forming stream 33 (e.g., using waste heat from a gas turbine generator or other suitable heat source). The high temperature supercritical fluid stream 33 is then expanded to atmospheric pressure in Expander EP-1, generating power. The low pressure vapor stream 34 is then cooled in exchanger E-2 forming stream 35, and condensed in Condenser E-1, forming stream 30. Lean LNG stream 16 is vaporized in the condenser E-1 using the condensation duty of the working fluid forming stream 17 for pipeline transmission.

It should be recognized that the use of the LNG refrigeration content in the ethane and/or LPG fractionation process requires significantly less capital and operating costs than conventional NGL recovery process (e.g., gas treating, dehydration, turbo-expander, refrigeration and residue gas compression are typically not required). Moreover, with the LNG refrigeration content being utilized for cooling, contemplated configurations and processes can achieve at least 90%, more typically at least 95%, and most typically at least 99% propane recovery, and at least 60%, more typically at least 75%, and most typically at least 80% ethane recovery in the rich LNG Thus, in particularly preferred plants and methods, the processed lean LNG condensate provides the heat sink for a power generation cycle, while a flashed liquid portion of the rich LNG is pumped, heated, and then expanded to produce work in an open cycle, without the gas recompression in conventional processes.

In further preferred plants, LNG processing may include separation of C2 from the C3+ component using a second column. In such configurations, it is contemplated that the C2+ components from the LNG are removed in the first column using the expanded vapor from the expander as a stripping medium, wherein the reflux duties of both column overhead condensers are provided by the refrigeration content in the rich LNG. As in configurations described above, it should be recognized that the open LNG expansion cycle supplies at least a portion of the power demand for the LNG regasification plant.

In such plants, it is preferred that at least a portion of the expanded gas is fed into a fractionation column as a stripping gas to produce a lean gas (ethane partially or totally depleted) and a column bottom product, wherein the lean gas may be re-condensed using at least part of the refrigeration content of the rich LNG. The demethanizer bottom product may then be fed to a second column that produces an ethane product and a LPG product. In further preferred aspects of such plants, it is contemplated that at least a portion of the reflux condenser duty of the two columns is provided by the refrigeration content of a portion of the rich and/or lean LNG before the heat source heats the liquefied natural gas, and/or that a second portion of the rich LNG is separated in a first column into a lean overhead gas and a ethane and/or C3 bottom product.

With respect to the power cycle it is contemplated that all known power cycles are suitable. However, it is typically preferred that power cycle is a Rankine power cycle that uses an expander to expand a multi-component working fluid (e.g., 0 to 20% methane, 20 to 40% ethane, and 20 to 40% propane, 10 to 30% butane, and 10 to 30% pentanes) to thereby produce work. Especially preferred working fluid compositions will utilize the cryogenic temperature of LNG during regasification of the residual lean LNG typically from about −150° F. to about 50° F. It should be appreciated that the varying condensation temperatures of the multi-component fluid advantageously utilize the varying LNG regasification temperatures with a close temperature approach and minimum loss work to allow for an efficient power cycle. Suitable Rankine cycles preferably comprise LNG pumping, preheating with the expander discharge, and LNG heating by an external heat source (e.g., flue gas from a gas turbine, waste heat recovery unit, and/or a fired heater). LNG exits the Rankine cycle typically at a temperature of up to about 50° F.

For example, in one preferred aspect of contemplated plants, the multi-component power generation is based on a Rankine power cycle but employs a multi-component working fluid as opposed to conventional fluid cycles that use a single component working fluid. The ideal Rankine cycle efficiency (or Carnot Cycle efficiency) can be defined as (T2−T1)/T2, where T2 is the absolute temperature of the heat source and T1 is the absolute temperature of the heat sink. When LNG is used as the heat sink, the temperature difference (T1−T2) is increased, resulting in higher generation efficiency. Thus, the inventor generally prefers a working fluid that is thermally stable at high temperature, and that condenses at low temperatures without freezing (e.g., propane/butane or a mixture of hydrocarbons).

It should be recognized that significant efficiency advantages are achieved when using a multi-component fluid as the working fluid in LNG power cogeneration. For example, the power generation efficiency using butane as a single component is relatively low due to its high condensation temperature (butane condenses at 30° F. at atmospheric pressure). Hence the very low temperature of LNG cannot be effectively utilized. Propane is a more efficient working fluid as it condenses at a lower temperature (e.g., propane condenses at −44° F. at atmospheric pressure). Other lower boiling fluids, such as ethane or ethylene, are generally not suitable for LNG vaporization, as their condensation temperatures are too low to heat the LNG without excessive superheating. In contrast, a multi-component fluid condenses at varying temperatures and the composition can be adjusted to match the shape of the LNG vaporization curve. With a close temperature approach, the condensation curve can be made parallel to the LNG vaporization curve, thereby maximizing power generation efficiency.

Figure 3:
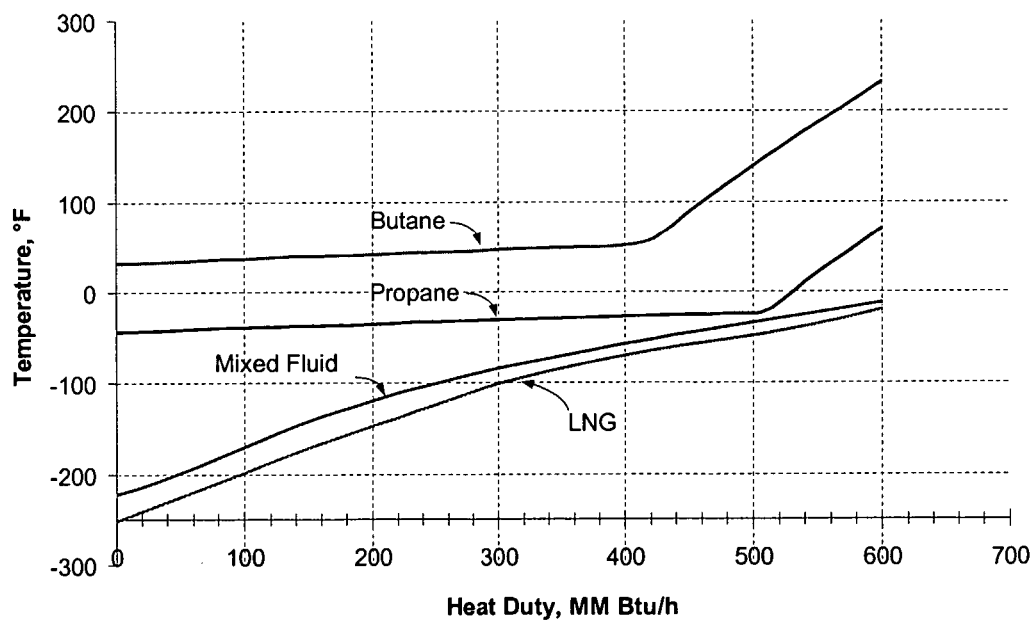
FIG. 3 is a comparison of the composite heat curves of the multi-component power cycle to conventional pure component cycles in LNG power cogeneration.

To compare the thermodynamic efficiencies of the different working fluids, the LNG vaporization curve is plotted against the condensation curves as exemplarily shown in FIG. 3. Butane and propane, due to their higher condensation temperatures, must be superheated at the condenser inlet in order to avoid temperature pinch in the exchanger. The mixed fluid is in a two-phase region (that is without any superheating) and is therefore more energy efficient (the multi-component fluid is totally condensed at −220° F.). It should be noted that there is an optimum mixed fluid composition that matches each LNG composition and vaporization pressure, and one exemplary optimum mixed fluid composition and corresponding LNG composition is shown in Table 1.

TABLE 1

| LNG Composition and Mixed Fluid Composition | | |
|---|---|---|
| MOL % | LNG | MULTI-COMPONENT FLUID |
| $C_1$ | 94.4 | 0.0 |
| $C_2$ | 5.2 | 32.4 |
| $C_3$ | 0.0 | 35.4 |
| $C_4$ | 0.0 | 13.3 |
| $C_5$ | 0.0 | 18.8 |

Due to the leaner LNG (that is depleted of the $C_3$ and $C_4$ components) and the higher operating temperature, the composition of the multi-component fluid must be adjusted to match the heat curve of the leaner LNG. The mixed fluid power cycle typically generates about 53 MW with the residual LNG (For this example, the expander inlet condition is based on about 1450 psig at 600° F.). Where the LNG contains a higher content of LPG components (that is $C_3$ and $C_4$ as shown in Table 2), the optimum mixed fluid composition needs to be adjusted to match the richer LNG composition. Another exemplary optimum mixed fluid composition for a richer LNG composition is shown in Table 2.

TABLE 2

LNG Composition and Mixed Fluid Composition

| MOL % | LNG | MULTI-COMPONENT FLUID |
|---|---|---|
| $C_1$ | 90 | 18 |
| $C_2$ | 5 | 24 |
| $C_3$ | 3 | 33 |
| $C_4$ | 2 | 24 |

Figure 2:
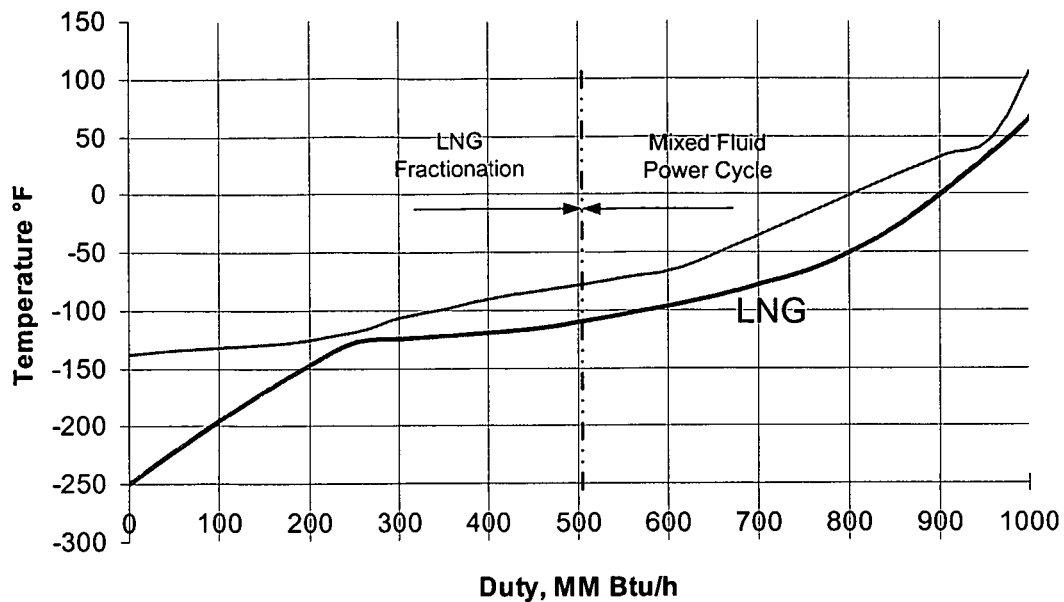
FIG. 2 is a schematic view of the composite heat curves of LNG and the fractionation and power generation processes of the inventive subject matter

The composite heat curves of the combined LNG fractionation and mixed fluid power generation process are plotted against the LNG composite vaporization heat curves, as shown in FIG. 2 (note that the LNG composite curve consists of the LNG vaporization at 500 psig, re-condensation of the leaner natural gas and vaporization of the leaner LNG at the higher pipeline pressure). The overall balance for an exemplary 1,200 MMscfd integrated LNG regasification/LPG production plant is shown in Table 3. Optionally, the process can also be operated to recovery over 75% of the ethane content from the rich LNG. In this case, an ethane overhead stream can be produced in a second column as an additional product.

TABLE 3

LPG Production Overall Balance

| MOL % | LNG FEED | LPG | PIPELINE GAS |
|---|---|---|---|
| $N_2$ | 0.0034 | 0.0000 | 0.0036 |
| $C_1$ | 0.8976 | 0.0028 | 0.9439 |
| $C_2$ | 0.0501 | 0.0200 | 0.0517 |
| $C_3$ | 0.0316 | 0.6251 | 0.0009 |
| $IC_4$ | 0.0069 | 0.1404 | 0.0000 |
| $NC_4$ | 0.0103 | 0.2096 | 0.0000 |
| $NC_5$ | 0.0001 | 0.0020 | 0.0000 |
| Btu/SCF (HHV) | 1,137 | 2,829 | 1,051 |
| MMscfd | 1,200 | 59 | 1,141 |
| Std. Barrels per day | | 40,742 | |

The 1,200 MMscfd LNG plant produces about 40,700 Barrel per day LPG, and about 1,137 MMscfd of 1050 Btu/SCF HHV pipeline gas. The LPG products are free of contaminants (H2S, mercaptans and CO2) that can be sold at a premium over LNG while the leaner natural gas is now in compliance with the pipeline transmission specifications on compositions, heating values and Wobbe Index. Thus, it should be recognized that ethane and/or LPG production can significantly contribute to profitability of the combined facility due to the higher value products.

In further contemplated aspects, it should be appreciated that power generation and LNG regasification can be thermally integrated such that waste heat from a gas turbine exhaust is recovered as a heat source for LNG vaporization (e.g., the LNG refrigeration content can be used for power generation in a closed loop power cycle). Alternatively, or additionally, LNG may also be employed in cooling and/or as a refrigerant in a cryogenic separation processes. Thus, in such configurations, ethane and/or LPG fractionation from imported LNG can be economically attractive, particularly when LNG is used in the cooling process. It should further be recognized that the ethane and/or LPG components in LNG are typically of high value as all or almost all of the undesirable contaminants (sulfur components) and heavy hydrocarbons (aromatics and higher hydrocarbons) have previously been removed in the liquefaction process. Consequently, the so produced LPG can meet all environmental requirements.

It should further be appreciated that contemplated configurations and methods can also be used for ethane recovery. In such case, ethane production requires a second column to fractionate the ethane from the C2+ NGL product (the first column would operate as a demethanizer recovering the ethane and heavier components while producing a leaner gas depleted of the ethane). Thus, it should be recognized that numerous advantages may be achieved using configurations according to the inventive subject matter. For example, contemplated configurations provide a highly efficient LNG power generation cycle that can be coupled with a heating value control unit utilizing fractionation, and re-condensation. In yet a further particularly preferred aspect, it should be appreciated that contemplated configurations allow LNG regasification plants less dependent on an external power supply, making the facilities self sufficient in power, more economical and flexible while providing the capability of processing of LNG with varying compositions and heat contents to meet the pipeline specifications, and allows LNG importers to buy any LNG in the open spot trading markets. It is envisioned that spot trading of LNG will become common in the near future when the global LNG demands continue to escalate. Moreover, contemplated configurations and methods are applicable for both, grass-root installations and retrofitting existing plants.

Thus, specific embodiments and applications of ethane and/or LPG and power cogeneration have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Furthermore, where a definition or use of a term in a reference, which is incorporated by reference herein is inconsistent or contrary to the definition of that term provided herein, the definition of that term provided herein applies and the definition of that term in the reference does not apply.

What is claimed is:

1. An LNG fractionation plant for production of lean LNG and at least one of ethane and LPG, comprising:

a heat exchanger that is coupled to a fractionator column and configured to employ refrigeration content of a rich LNG to allow (I) partial condensation of a fractionator column overhead to thereby allow production of a fractionator reflux stream, (II) full condensation of a lean vapor to thereby allow formation of a lean LNG condensate, and (III) allow formation of a heated rich LNG from the rich LNG;

a separation vessel that is configured to allow separation of the heated rich LNG into a vapor portion and a liquid portion;

a second separation vessel that is configured to allow separation of the partially condensed fractionator column overhead into the fractionator reflux stream and the lean vapor;

a pump that pumps the liquid portion of heated rich LNG to thereby form a pressurized supercritical liquid portion;

a heater that is configured to allow heating of the pressurized supercritical liquid portion to thereby allow formation of a pressurized supercritical and superheated vapor;

a power generator driven by an expander, wherein the expander is configured to be driven by the superheated vapor to thereby allow production of power and a stripping vapor; and wherein the fractionator column is further configured to receive the fractionator reflux stream, the vapor portion, and the stripping vapor stream.

2. The LNG fractionation plant of claim 1 coupled to a Rankine power cycle that utilizes residual cold from the lean LNG condensate to condense a working fluid in the power cycle.

3. The LNG fractionation plant of claim 1 further comprising a pump that is configured to pump the lean LNG to pipeline pressure.

4. The LNG fractionation plant of claim 2 wherein the working fluid in the power cycle comprises a multi-component fluid including at least one of nitrogen, methane, ethane, propane, butane, and pentane.

5. The LNG fractionation plant of claim 1 wherein the heater is a heat exchanger that is configured to heat the pressurized supercritical liquid portion.

6. The LNG fractionation plant of claim 5 wherein the heater is configured to provide at least a portion of the stripping and heating requirements for the fractionator via the expanded supercritical superheated portion of the rich LNG.

7. A method of operating a plant, comprising:

heating in a heat exchanger a rich LNG to form a heated rich LNG, and separating the heated rich LNG into a liquid portion and a vapor portion;

pressurizing and heating the liquid portion, expanding the pressurized and heated portion to thereby generate power, and feeding the expanded portion to a fractionator;

feeding the vapor portion to the fractionator to thereby produce at least one of ethane and LPG, and a fractionator overhead vapor;

partially condensing the fractionator overhead vapor in the heat exchanger using refrigeration of the rich LNG to thereby produce a lean vapor and a lean liquid;

separating the lean vapor and the lean liquid;

pumping the lean liquid as reflux to the fractionator, and condensing the lean vapor in the heat exchanger using refrigeration content of the rich LNG to form a lean LNG condensate; and pumping the lean LNG condensate to pipeline pressure and vaporizing the lean LNG condensate in a second heat exchanger using condensation duty of a working fluid operating a power cycle.

8. The method of claim 7 wherein the partially condensed fractionator overhead vapor is separated in a second separator to thereby form the lean vapor and lean liquid.

9. The method of claim 7 wherein the step of heating the liquid portion of the rich LNG provides at least a portion of the heating and stripping requirements for the fractionator via the heated pressurized supercritical portion of the rich LNG.

10. The method of claim 7 further comprising a step of pressurizing the condensed LNG overhead product to pipeline pressure before the step of vaporizing the condensed LNG overhead product.

11. The method of claim 7 wherein the working fluid comprises a multi-component fluid including at least one of methane, ethane, propane, butane, and pentane.

12. The method of claim 7 wherein at least 95% propane is recovered.

13. The method of claim 7 wherein at least at least 75% ethane is recovered.

14. A method of processing a rich LNG into a lean LNG, comprising:

using refrigeration content of a rich LNG in a heat exchanger to (I) partially condense a fractionator overhead vapor, (II) fully condense a vapor fraction of the partially condensed fractionator overhead vapor, thereby forming the lean LNG, and (III) to thereby form heated rich LNG;

separating the heated rich LNG into a vapor portion and a liquid portion, and feeding the vapor portion into a fractionator to thereby produce at least one of ethane and LPG;

separating the partially condensed fractionator overhead vapor into the vapor fraction and a liquid fraction;

pressurizing and heating the liquid portion, and expanding the pressurized and heated liquid portion to thereby generate power prior to feeding the pressurized and heated liquid portion into the fractionator; and using the liquid fraction of the partially condensed fractionator overhead vapor in the fractionator as reflux.

15. The method of claim 14 wherein the pressurized and heated liquid portion is heated and pressurized to supercritical pressure and superheated temperature.

16. The method of claim 14 wherein the lean LNG is vaporized using heat from a working fluid of a power cycle.

* * * * *